United States Patent
Zhan et al.

(10) Patent No.: US 11,939,487 B2
(45) Date of Patent: Mar. 26, 2024

(54) SPIROOXAZINE PHOTOCHROMIC EXTERIOR WALL COATING AND PREPARATION METHOD THEREOF

(71) Applicant: China Machinery Foundry Material Technology (Fujian) Co., LTD, Sanming (CN)

(72) Inventors: Wen Zhan, Sanming (CN); Wangchuan Xiao, Sanming (CN); Yutao Zhang, Sanming (CN); Jinxing Su, Sanming (CN); Gaoshun Chen, Sanming (CN); Jiandong Lei, Sanming (CN); Weiping Luo, Sanming (CN)

(73) Assignee: CHINA MACHINERY FOUNDRY MATERIAL TECHNOLOGY (FUJIAN) CO., LTD, Sanming (CN)

( * ) Notice: Subject to any disclaimer, the term of this patent is extended or adjusted under 35 U.S.C. 154(b) by 0 days.

(21) Appl. No.: 18/313,472

(22) Filed: May 8, 2023

(65) Prior Publication Data
US 2024/0052194 A1 Feb. 15, 2024

(30) Foreign Application Priority Data
Jul. 31, 2022 (CN) .......................... 202210912995.3

(51) Int. Cl.
C09D 133/12 (2006.01)
C08K 13/02 (2006.01)
(Continued)

(52) U.S. Cl.
CPC ............ *C09D 133/12* (2013.01); *C08K 13/02* (2013.01); *C09D 7/20* (2018.01); *C09D 7/48* (2018.01);
(Continued)

(58) Field of Classification Search
CPC .......... C09D 133/12; C09D 7/61; C09D 7/20; C09D 7/48; C08K 13/02; C08K 2003/2241
See application file for complete search history.

(56) References Cited

U.S. PATENT DOCUMENTS

2004/0012002 A1* 1/2004 Vassal ............... C08G 18/0823
252/586
2005/0252128 A1 11/2005 Colbert et al.
(Continued)

OTHER PUBLICATIONS

CNIPA, Notification to grant patent right for invention in CN202210912995.3, dated Feb. 16, 2023.

*Primary Examiner* — Robert S Jones, Jr.
*Assistant Examiner* — Jiangtian Xu
(74) *Attorney, Agent, or Firm* — Zhigang Ma

(57) ABSTRACT

The present invention discloses a spirooxazine photochromic exterior wall coating, comprising the following components by mass percent: 0.6%-1.5% of spirooxazine photochromic compound, 40%-45% of resin, 0.3%-1% of dispersant, 0.2%-0.3% of antifoamer, 1%-3% of additive, 22%-24% of pigment and 30%-32% of solvent. The additive comprises 0.9 wt %-2 wt % of NaCl or KCl solution. The present invention further provides a preparation method for the spirooxazine photochromic exterior wall coating, comprising measuring, grinding, dispersing, mixing, adjusting pH and filtering. Experiments prove that the spirooxazine photochromic exterior wall coating provided by the present invention has good light fatigue resistance effect and can meet the needs of long-term use of building exterior walls.

11 Claims, 1 Drawing Sheet

(51) Int. Cl.
*C09D 7/20* (2018.01)
*C09D 7/48* (2018.01)
*C09D 7/61* (2018.01)
*C08K 3/22* (2006.01)

(52) U.S. Cl.
CPC ........ *C09D 7/61* (2018.01); *C08K 2003/2241* (2013.01)

(56) References Cited

U.S. PATENT DOCUMENTS

2006/0188723 A1  8/2006  Rowley et al.
2015/0122399 A1  5/2015  Blanchard

* cited by examiner

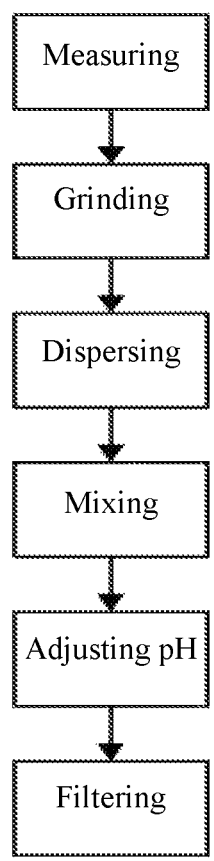

SPIROOXAZINE PHOTOCHROMIC EXTERIOR WALL COATING AND PREPARATION METHOD THEREOF

TECHNICAL FIELD

The present invention belongs to the technical field of photochromic coatings, and particularly relates to a spirooxazine photochromic exterior wall coating and a preparation method.

BACKGROUND

Photochromism refers to the change of molecular structure or electronic configuration of a compound under the action of light of certain wavelength and intensity, which leads to the change of its absorption peak value for light, that is, the corresponding change of color. This phenomenon is generally reversible. Photochromic compounds refer to compounds that can produce a photochromic phenomenon after being excited by a light source. Existing photochromic compounds mainly include inorganic photochromic compounds and organic photochromic compounds. The discoloration principle of the inorganic photochromic compounds is mainly accompanied by reversible oxidation-reduction reactions, and the discoloration principle of the organic photochromic compounds is mainly accompanied by many processes related to photochemical reactions, which lead to the change of the molecular structure of the compounds. The reaction modes mainly include valence bond isomerism, cis-trans isomerism, bond rupture, polymerization, oxidation-reduction, pericyclic reactions, etc. At present, photochromic coatings are generally viscous liquid prepared from organic solvents or water by taking resin or emulsion as a film forming substance and adding corresponding additives such as photochromic compounds, pigment, fillers, antifoamer and leveling agents. The photochromic coatings can be used as high-grade building exterior wall coatings and marker building coatings for beautifying the environment, and can also be used as various anti-counterfeiting coatings.

The existing Chinese patent with a patent title of a photochromic lacquer coating for building external walls and publication number of CN111040531A comprises the following raw materials in parts by weight: 5.8-6 parts of 1-allyl-6-chlorospiro [2H-1-benzopyran indoline], 45-50 parts of acrylic acid, 14-16 parts of N,N-dimethylformamide, 30-35 parts of methyl methacrylate, 0.5-0.6 part of emulsifier, 0.2-0.3 part of initiator, 0.025-0.03 part of leveling agent, 0.025-0.03 part of antifoamer, 0.055-0.06 part of electronic conductive agent, 0.085-0.09 part of amine compound, 2.5-3.0 parts of natural color quartz sand and 0.025-0.03 part of magnesium aluminum silicate. The present invention introduces the small molecule compound 1-allyl-6-chlorospiro [2H-1-benzopyran-2,2-indoline] with photochromic functional groups into a main polymer chain by a copolymerization method to prepare the photochromic lacquer coating. The present invention mainly uses spiropyrane photochromic compounds to realize the photochromic function of the coating, but the spiropyrane photochromic compounds have poor light fatigue resistance. That is, photodegradation reactions will occur after the compound is exposed to long-term light. These irreversible reactions will reduce the discoloration properties of the compound until the discoloration properties are lost, thereby shortening the service life. A spirooxazine photochromic compound is developed on the basis of the spiropyrane photochromic compound, and has the advantages of fast response, stable chemical properties and good light fatigue resistance. The discoloration principle is: under ultraviolet excitation, the spiral C—O bond of spirooxazine molecule is heterosplit, so that the structure and electronic configuration of the molecule are isomerized and rearranged, and the spirooxazine molecule changes from a colorless closed-loop body SO to an open photomerocyanine PMC, thereby making the color change. After stopping ultraviolet irradiation, PMC generates closed-loop reaction and changes back to the closed-loop body SO, thereby forming a reversible photochromic system. The photochromic process of spirooxazine is as follows:

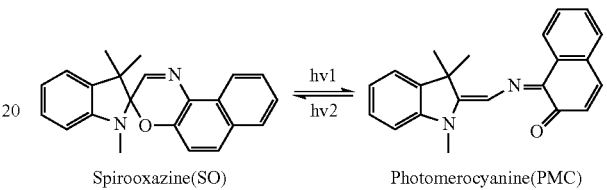

Spirooxazine(SO)      Photomerocyanine(PMC)

The spirooxazine photochromic compound has wide application prospects in the field of photochromic coatings. However, at present, the practicability of a spirooxazine photochromic exterior wall coating applied to building exterior walls is still weak, because the a spirooxazine photochromic exterior wall coating is attached to the surface of an object and needs to accept a long time of illumination in a single day. In order to avoid the increase of economic cost caused by frequent coating, requirements for the light fatigue resistance of the exterior wall coating applied to practical application are usually very high, but the light fatigue resistance of the spirooxazine photochromic exterior wall coating has not reached the requirements of practical application. Therefore, it is necessary to further improve the light fatigue resistance of the spirooxazine photochromic exterior wall coating.

SUMMARY

The purpose of the present invention is to provide a spirooxazine photochromic exterior wall coating and a preparation method to solve problems proposed in the above background.

To achieve the above purpose, the present invention provides the following technical solution:

A spirooxazine photochromic exterior wall coating comprises the following components by mass percent: 0.6%-1.5% of spirooxazine photochromic compound, 40%-45% of resin, 0.3%-1% of dispersant, 0.2%-0.3% of antifoamer, 1%-3% of additive, 22%-24% of pigment and 30%-32% of solvent, and the additive comprises 0.9 wt %-2 wt % of NaCl or KCl solution.

Preferably, the additive further comprises a light stabilizer LS-622, and the mass ratio of 0.9 wt %-2 wt % of NaCl or KCl solution to the light stabilizer LS-622 is 3:2.

Preferably, the solvent is prepared by mixing ethanol, ethyl acetate and acetone by a mass ratio of 4:3:3 or 2:1:1

Preferably, the spirooxazine photochromic compound adopts 1,3,3-trimethyl-3H-indolinospironaphthoxazine with content of 0.6%, and the pigment adopts titanium dioxide.

Preferably, the resin adopts one of polymethyl methacrylate, polyethyl methacrylate or polybutyl methacrylate.

Preferably, the dispersant adopts an ammonium polyacrylate dispersant.

Preferably, the antifoamer adopts polyoxypropylene oxyethylene glycol ether.

A preparation method for the spirooxazine photochromic exterior wall coating comprises the following steps:

S1. measuring: measuring 0.6%-1.5% of spirooxazine photochromic compound, 40%-45% of resin, 0.3%25-1% of dispersant, 0.2%-0.3% of antifoamer, 1%-3% of additive, 22%-24% of pigment and 30%-32% of solvent;

S2. grinding: mixing the spirooxazine photochromic compound and the pigment measured in S1 and then grinding into powder with fineness of 100-300-mesh sieve by using a grinding device;

S3. dispersing: adding 50% of resin measured in step S1, dispersant, 30% of solvent measured in S1, and mixed powder obtained in step S2 to a high-speed disperser and dispersing for 10-15 min at rotation speed of 1500-1800 r/min;

S4. mixing: putting the materials obtained in S3 into a mixing container, adding the remaining resin, solvent, antifoamer and additive, and stirring and mixing for 30-50 min at the rotation speed of 450-600 r/min;

S5. adjusting pH: adjusting pH with 1 mol/L NaOH solution, so that PH value is 8-8.5;

S6. filtering: filtering out insoluble solid impurities with a 100-300-mesh sieve to obtain a coating finished product.

Preferably, in step S4, the materials obtained in S3, 35% of the solvent measured in S1, and the additive are stirred for 10-20 min at the rotation speed of 550-600 r/min, and then the remaining resin, 35% of the solvent measured in S1, and the antifoamer are added and stirred for 20-30 min at the rotation speed of 450-500 r/min.

Compared with the prior art, the present invention has the following beneficial effects:

1. The spirooxazine photochromic exterior wall coating provided by the present invention uses the resin as the main film forming material; the dispersant, the antifoamer, the solvent and the pigment which are commonly used raw materials for production of the exterior wall coating are added; and the photochromic compounds with good light fatigue resistance developed based on spiropyrane photochromic compounds, such as proper quantity of spirooxazine photochromic compounds, are added. Moreover, a proper amount of added Cl-ions in 0.9 wt %-2 wt % NaCl and KCl solution can produce a large amount of dichloride free radicals $Cl_2^-$— under ultraviolet or solar irradiation, which can inhibit the $O_2^-$— free radical generated by the photodegradation reaction of the spirooxazine photochromic compounds and slow down the photodegradation reaction of the spirooxazine photochromic compounds, thereby slowing down the light fatigue phenomenon of the spirooxazine photochromic exterior wall coating. The test experiments of light fatigue resistance of the coating show that the spirooxazine photochromic exterior wall coating provided by the present invention has good light fatigue resistance and meets the requirements of commercialization.

2. The spirooxazine photochromic exterior wall coating provided by the present invention adopts the mixed organic solvent which enhances the hydrophilicity of the coating. The PMC open-loop structure of the spirooxazine photochromic compound has low polarity, and the PMC open-loop structure under photoexcitation is more stable in polar solvents than the ground-state S0 closed-loop structure. In the ethanol solvent, the PMC open-loop body of the spirooxazine photochromic compound forms intermolecular hydrogen bonds with the ethanol solvent, which enhances the stability of photochromic PMC open-loop body. With the increase of illumination time, the spirooxazine photochromic compound is not easy to show color weakening, thereby delaying the light fatigue phenomenon of the spirooxazine photochromic exterior wall coating and improving the light fatigue resistance of the spirooxazine photochromic exterior wall coating.

3. The spirooxazine photochromic exterior wall coating provided by the present invention adopts the light stabilizer LS-622 with the ability to capture free radicals, to further slow down the photodegradation reaction of the spirooxazine photochromic compound, so as to further improve the light fatigue resistance of the spirooxazine photochromic exterior wall coating.

4. The spirooxazine photochromic exterior wall coating provided by the present invention adopts the titanium dioxide as a white pigment substrate matched with 0.6% of 1,3,3-trimethyl-3H-indolinospironaphthoxazine which is a spirooxazine photochromic compound, and the color discrimination of the prepared photochromic exterior wall coating is suitable for observation through human eyes.

5. The spirooxazine photochromic exterior wall coating provided by the present invention adopts polyacrylate resin with good weatherability, and adopts the ammonium polyacrylate dispersant with good dispersibility and wetting effect, thereby enhancing the rheological property of the coating, making it difficult to be precipitated and roughened and improving the stability of the film formed by the photochromic exterior wall coating on the building external wall.

6. The preparation method for the spirooxazine photochromic exterior wall coating provided by the present invention produces the finished product coating through measuring, grinding, dispersing, mixing, adjusting PH and filtering. The produced coating has uniform texture and is not easy to be roughened. The spirooxazine photochromic compound, the additive and part of solvent are stirred and mixed at a higher speed, and then other substances are stirred and mixed at a lower speed, so that the spirooxazine photochromic compound and the additive are more closely combined, which is beneficial to sufficiently improve the light fatigue resistance of the spirooxazine photochromic exterior wall coating.

DESCRIPTION OF DRAWINGS

FIG. 1 is a flow chart of a spirooxazine photochromic exterior wall coating provided by the present invention.

DETAILED DESCRIPTION

The technical solutions in embodiments of the present invention will be clearly and fully described below. Apparently, the described embodiments are merely part of the embodiments of the present invention, not all of the embodiments. Based on the embodiments in the present invention, all other embodiments obtained by those ordinary skilled in the art without contributing creative labor will belong to the protection scope of the present invention.

Embodiment 1

A spirooxazine photochromic exterior wall coating comprises the following components by mass percent:

0.6% of 1,3,3-trimethyl-3H-indolinospironaphthoxazine, 42% of polymethyl methacrylate resin, 0.5% of ammonium polyacrylate dispersant, 0.2% of polyoxypropylene oxyethylene glycol ether, 1.7% of 0.9 wt % NaCl solution, 23% of titanium dioxide and 32% of solvent. Cl— ions in NaCl solution produce a large amount of dichloride free radicals $Cl_2 \cdot$—under ultraviolet or solar irradiation, which can inhibit the $O_2 \cdot$— free radical generated by the photodegradation reaction of the spirooxazine photochromic compounds and slow down the photodegradation reaction of the spirooxazine photochromic compounds, thereby slowing down the light fatigue phenomenon of the spirooxazine photochromic exterior wall coating.

The coating adopts polyacrylate resin with good weatherability, and adopts the ammonium polyacrylate dispersant with good dispersibility and wetting effect, thereby enhancing the rheological property of the coating, making it difficult to be precipitated and roughened and improving the stability of the film formed by the photochromic exterior wall coating on the building external wall. The coating adopts the titanium dioxide as a white pigment substrate matched with 0.6% of 1,3,3-trimethyl-3H-indolinospironaphthoxazine which is a spirooxazine photochromic compound, and the color discrimination of the prepared photochromic exterior wall coating is suitable for observation through human eyes. When the doping amount of 1,3,3-trimethyl-3H-indolinospironaphthoxazine in the coating formula is increased, the color of the coating film formed by the coating on the surface of the building exterior wall becomes darker under ultraviolet or sunlight irradiation; and when the doping amount of 1,3,3-trimethyl-3H-indolinospironaphthoxazine is reduced, the color of the coating film becomes lighter under ultraviolet or sunlight irradiation, which can be used by architectural designers for color mixing.

The solvent is prepared by mixing ethanol, ethyl acetate and acetone by a ratio of 4:3:3. The PMC open-loop structure of 1,3,3-trimethyl-3H-indolinospironaphthoxazine has low polarity, and the PMC open-loop structure under photoexcitation is more stable in polar solvents than the ground-state SO closed-loop structure. In the ethanol solvent, the PMC open-loop body of 1,3,3-trimethyl-3H-indolinospironaphthoxazine forms intermolecular hydrogen bonds with the ethanol solvent, which enhances the stability of photochromic PMC open-loop body. With the increase of illumination time, 1,3,3-trimethyl-3H-indolinospironaphthoxazine is not easy to show color weakening, thereby delaying the light fatigue phenomenon of the spirooxazine photochromic exterior wall coating and improving the light fatigue resistance of the spirooxazine photochromic exterior wall coating.

A preparation method for the spirooxazine photochromic exterior wall coating comprises the following steps:
S1. measuring: measuring 0.6% of 1,3,3-trimethyl-3H-indolinospironaphthoxazine, 42% of polymethyl methacrylate resin, 0.5% of ammonium polyacrylate dispersant, 0.2% of polyoxypropylene oxyethylene glycol ether, 1.7% of 0.9 wt % NaCl solution, 23% of titanium dioxide and 32% of solvent;
S2. grinding: mixing the spirooxazine photochromic compound and the titanium dioxide measured in S1 and then grinding into powder with fineness of 200-mesh sieve by using a grinding device;
S3. dispersing: adding 50% of polymethyl methacrylate resin measured in S1, ammonium polyacrylate dispersant, 30% of solvent measured in S1, and mixed powder obtained in S2 to a high-speed disperser and dispersing for 12 min at rotation speed of 1500 r/min;
S4. mixing: putting the materials obtained in S3 into a mixing container, stirring the materials obtained in S3, 0.9 wt % NaCl solution, and 35% of solvent measured in S1 for 15 min at the rotation speed of 550 r/min, adding the remaining polymethyl methacrylate resin, 35% of solvent measured in S1 and polypropylene oxyethylene glycol ether and stirring for 25 min at the rotation speed of 450 r/min;
S5. adjusting pH: adjusting pH value to 8 with 1 mol/L NaOH solution;
S6. filtering: filtering out insoluble solid impurities with a 200-mesh sieve to obtain a coating finished product.

The finished product coating is produced through measuring, grinding, dispersing, mixing, adjusting PH and filtering. The produced coating has uniform texture and is not easy to be roughened. 1,3,3-trimethyl-3H-indolinospironaphthoxazine, 0.9 wt % NaCl solution and part of solvent are stirred and mixed at a higher speed, and then other substances are stirred and mixed at a lower speed, so that the 1,3,3-trimethyl-3H-indolinospironaphthoxazine and 0.9 wt % NaCl solution are more closely combined, which is beneficial to sufficiently improve the light fatigue resistance of the spirooxazine photochromic exterior wall coating.

Reference example 1: Different from embodiment 1, the additive used in reference example 1 is a light stabilizer LS-622.

Embodiment 2

A spirooxazine photochromic exterior wall coating comprises the following components by mass percent:
0.6% of 1,3,3-trimethyl-3H-indolinospironaphthoxazine, 42% of polyethyl methacrylate resin, 1% of ammonium polyacrylate dispersant, 0.3% of polypropylene oxyethylene glycol ether, 2.1% of 0.9 wt % KCl solution, 23% of titanium dioxide and 31% of solvent; and the solvent is prepared by mixing ethanol, ethyl acetate and acetone by a ratio of 2:1:1.

A preparation method for the spirooxazine photochromic exterior wall coating comprises the following steps:
S1. measuring: measuring 0.6% of 1,3,3-trimethyl-3H-indolinospironaphthoxazine, 42% of polyethyl methacrylate resin, 1% of ammonium polyacrylate dispersant, 0.3% of polypropylene oxyethylene glycol ether, 2.1% of 0.9 wt % KCl solution, 23% of titanium dioxide and 31% of solvent;
S2. grinding: mixing the 1,3,3-trimethyl-3H-indolinospironaphthoxazine and the titanium dioxide measured in S1 and then grinding into powder with fineness of 100-mesh sieve by using a grinding device;
S3. dispersing: adding 50% of polyethyl methacrylate resin measured in S1, ammonium polyacrylate dispersant, 30% of solvent measured in S1, and mixed powder obtained in S2 to a high-speed disperser and dispersing for 13 min at rotation speed of 1600 r/min;
S4. mixing: putting the materials obtained in S3 into a mixing container, stirring the materials obtained in S3, 0.9 wt % KCl solution, the light stabilizer LS-622 and 35% of solvent measured in S1 for 15 min at the rotation speed of 600 r/min, adding the remaining polyethyl methacrylate resin, 35% of solvent measured in S1 and polypropylene oxyethylene glycol ether and stirring for 25 min at the rotation speed of 500 r/min;

S5. adjusting pH: adjusting pH value to 8.5 with 1 mol/L NaOH solution;

S6. filtering: filtering out insoluble solid impurities with a 100-mesh sieve to obtain a coating finished product.

Reference example 2: Different from embodiment 2, the additive used in reference example 2 is a light stabilizer LS-622 and the solvent adopts ethyl acetate.

Embodiment 3

A spirooxazine photochromic exterior wall coating is prepared from the following components:

0.6% of 1,3,3-trimethyl-3H-indolinospironaphthoxazine, 42% of polybutyl methacrylate resin, 1% of ammonium polyacrylate dispersant, 0.3% of polypropylene oxyethylene glycol ether, 2.1% of 1.5 wt % NaCl solution, 22% of titanium dioxide and 32% of ethyl acetate.

A preparation method for the spirooxazine photochromic exterior wall coating comprises the following steps:

S1. measuring: 0.6% of 1,3,3-trimethyl-3H-indolinospironaphthoxazine, 42% of polybutyl methacrylate resin, 1% of ammonium polyacrylate dispersant, 0.3% of polypropylene oxyethylene glycol ether, 2.1% of 1.5 wt % NaCl solution, 22% of titanium dioxide and 32% of ethyl acetate;

S2. grinding: mixing the 1,3,3-trimethyl-3H-indolinospironaphthoxazine and the titanium dioxide measured in S1 and then grinding into powder with fineness of 200-mesh sieve by using a grinding device;

S3. dispersing: adding 50% of resin measured in S1, dispersant, 30% of ethyl acetate measured in S1, and mixed powder obtained in S2 to a high-speed disperser and dispersing for 15 min at rotation speed of 1500 r/min;

S4. mixing: putting the materials obtained in S3 into a mixing container, stirring the materials obtained in S3, 1.5 wt % NaCl solution, and 35% of ethyl acetate measured in S1 for 15 min at the rotation speed of 600 r/min, adding the remaining resin, 35% of ethyl acetate measured in S1 and polypropylene oxyethylene glycol ether and stirring for 25 min at the rotation speed of 500 r/min;

S5. adjusting pH: adjusting pH value to 8 with 1 mol/L NaOH solution;

S6. filtering: filtering out insoluble solid impurities with a 200-mesh sieve to obtain a coating finished product.

Reference example 3: Different from embodiment 3, the solvent in reference example 3 adopts ethyl acetate.

Embodiment 4

A spirooxazine photochromic exterior wall coating comprises the following components by mass percent:

0.6% of 1,3,3-trimethyl-3H-indolinospironaphthoxazine, 42% of polybutyl methacrylate resin, 1% of ammonium polyacrylate dispersant, 0.3% of polypropylene oxyethylene glycol ether, 2.1% of 1.5 wt % NaCl solution, 22% of titanium dioxide and 32% of solvent, and the solvent is prepared by mixing ethanol, ethyl acetate and acetone by a ratio of 4:3:3.

A preparation method for the spirooxazine photochromic exterior wall coating comprises the following steps:

S1. measuring: 0.6% of 1,3,3-trimethyl-3H-indolinospironaphthoxazine, 42% of polybutyl methacrylate resin, 1% of ammonium polyacrylate dispersant, 0.3% of polypropylene oxyethylene glycol ether, 2.1% of 1.5 wt % NaCl solution, 22% of titanium dioxide and 32% of solvent;

S2. grinding: mixing the 1,3,3-trimethyl-3H-indolinospironaphthoxazine and the titanium dioxide measured in S1 and then grinding into powder with fineness of 200-mesh sieve by using a grinding device;

S3. dispersing: adding 50% of resin measured in S1, dispersant, 30% of solvent measured in S1, and mixed powder obtained in S2 to a high-speed disperser and dispersing for 15 min at rotation speed of 1500 r/min;

S4. mixing: putting the materials obtained in S3 into a mixing container, stirring the materials obtained in S3, 1.5 wt % NaCl solution, and 35% of solvent measured in S1 for 15 min at the rotation speed of 600 r/min, adding the remaining resin, 35% of solvent measured in S1 and polypropylene oxyethylene glycol ether and stirring for 25 min at the rotation speed of 500 r/min;

S5. adjusting pH: adjusting pH value to 8.5 with 1 mol/L NaOH solution;

S6. filtering: filtering out insoluble solid impurities with a 200-mesh sieve to obtain a coating finished product.

Embodiment 5

A spirooxazine photochromic exterior wall coating comprises the following components by mass percent:

1.5% of 1,3,3-trimethyl-3H-indolinospironaphthoxazine, 40% of polymethyl methacrylate resin, 1% of ammonium polyacrylate dispersant, 0.2% of polypropylene oxyethylene glycol ether, 2% of additive, 23.3% of titanium dioxide and 32% of solvent, wherein the additive is prepared from 0.9 wt % NaCl solution and light stabilizer LS-622 by a mass ratio of 3:2. The photodegradation reaction of the spirooxazine photochromic compound is further slowed down by using the light stabilizer LS-622 with the ability to capture free radicals, so as to further improve the light fatigue resistance of the spirooxazine photochromic exterior wall coating. The solvent is prepared by mixing ethanol, ethyl acetate and acetone by a mass ratio of 4:3:3.

A preparation method for the spirooxazine photochromic exterior wall coating comprises the following steps:

S1. measuring: measuring 1.5% of 1,3,3-trimethyl-3H-indolinospironaphthoxazine, 40% of polymethyl methacrylate resin, 1% of ammonium polyacrylate dispersant, 0.2% of polypropylene oxyethylene glycol ether, 2% of additive, 23.3% of titanium dioxide and 32% of solvent;

S2. grinding: mixing the 1,3,3-trimethyl-3H-indolinospironaphthoxazine and the titanium dioxide measured in S1 and then grinding into powder with fineness of 200-mesh sieve by using a grinding device;

S3. dispersing: adding 50% of polymethyl methacrylate resin measured in step S1, dispersant, 30% of solvent measured in S1, and mixed powder obtained in step S2 to a high-speed disperser and dispersing for 15 min at rotation speed of 1700 r/min;

S4. mixing: stirring the materials obtained in S3, 35% of solvent measured in S1 and additive for 20 min at the rotation speed of 600 r/min, adding the remaining polymethyl methacrylate resin, 35% of solvent measured in S1 and polypropylene oxyethylene glycol ether and stirring for 20 min at the rotation speed of 500 r/min;

S5. adjusting pH: adjusting pH with 1 mol/L NaOH solution, so that PH value is 8.5;

S6. filtering: filtering out insoluble solid impurities with a 200-mesh sieve to obtain a coating finished product.

Reference example 4: Different from embodiment 5, the solvent in reference example 4 adopts ethyl acetate.

Light Fatigue Resistance Test

The coatings obtained in embodiments 1-5 are coated on 5 4 cm×4 cm quartz glass sheets with thickness of 10 mm respectively by a coater with thickness of 20 um. The above 6 quartz glass sheets are dried by a hot air oven at a drying temperature of 50° C. and drying time of 20 s. UVA-340 lamp tubes are used for irradiation at room temperature. After 8 hours of irradiation, the quartz glass sheets are placed in a dark environment for 2 hours, cooled to room temperature, and then irradiated for 8 hours, and the cycle is 10 times. The discoloration time and fading time in the 8-hour irradiation process are recorded, and the total color difference ΔE of embodiments 1-5 during two photochromic coloration is tested by a color difference meter. x, y and Y, namely chromaticity coordinates and luminance factors, can be obtained by measuring a sample with the instrument. The position of the measured color in a chromaticity diagram can be known through the chromaticity diagram. In order to make the color space more consistent with the color difference observed visually, x, y, and Y are changed into a*, b*, and L* values through a series of transformations, wherein the size of a* value represents red and green phases (positive value is red), b* value represents yellow and blue phases (positive value is yellow), and L* value represents luminance, i.e., black and white phases (0 represents black and 100 represents white). In this way, each color shows a group of corresponding a*, b* and L* values, and two different colors show different a*, b* and L* values, so that Δa, Δb and ΔL are obtained. The total color difference between the two colors can be calculated by the gap between the chromaticity and the gap between the luminance, and represented by ΔE. The color difference meter can print out the a*, b* and L* data of the two colors, and can print the color difference value ΔE directly through a computer system. The experiments are repeated for many times to obtain a mean value:

embodiments 4 and 5 is reduced, which indicates that the light stabilizer in the present invention only plays an auxiliary role in improving the light fatigue resistance of the spirooxazine photochromic exterior wall coating. The color difference between embodiment 3 and reference example 3 and the color difference between embodiment 5 and reference example 4 are reduced to a certain extent. The discoloration time and the fading time are shortened, indicating that the solvent formed by mixing ethanol, ethyl acetate and acetone by a ratio of 4:3:3 in the present invention has an auxiliary role in improving the light fatigue resistance of the spirooxazine photochromic exterior wall coating.

Although the embodiments of the present invention have been shown and described, it will be appreciated that various variations, amendments, replacements and modifications can be made by those ordinary skilled in the art without departing from the principle and spirit of the present invention, and the scope of the present invention is limited by the appended claims and the equivalents thereof.

What is claimed is:

1. A spirooxazine photochromic exterior wall coating, comprising the following components by mass percent: 0.6%-1.5% of spirooxazine photochromic compound, 40%-45% of resin, 0.3%-1% of dispersant, 0.2%-0.3% of antifoamer, 1%-3% of additive, 22%-24% of pigment and 30%-32% of solvent, wherein the additive comprises 0.9 wt %-2 wt % of NaCl or KCl solution; the solvent is prepared by mixing ethanol, ethyl acetate and acetone by a mass a ratio of 4:3:3 or 2:1:1; and the spirooxazine photochromic compound comprises 1,3,3-trimethyl-3H-indolino-spironaphthoxazine.

2. The spirooxazine photochromic exterior wall coating according to claim 1, wherein the additive further comprises a light stabilizer LS-622, and the mass ratio of 0.9 wt %-2 wt % of NaCl or KCl solution to the light stabilizer LS-622 is 3:2.

3. The spirooxazine photochromic exterior wall coating according to claim 1, wherein the resin is one of polymethyl methacrylate, polyethyl methacrylate or polybutyl methacrylate.

TABLE 1

Statistics of Light Fatigue Resistance Test

| | Embodiment 1 | Embodiment 2 | Embodiment 3 | Embodiment 4 | Embodiment 5 | Reference example 1 | Reference example 2 | Reference example 3 | Reference example 4 |
|---|---|---|---|---|---|---|---|---|---|
| Discoloration time | 2 s | 3 s | 2 s | 3 s | 2 s | 10 s | 12 s | 11 s | 8 |
| Fading time | 15 s | 15 s | 13 s | 17 s | 16 s | 30 s | 35 s | 31 s | 29 s |
| ΔE | 1.5 | 1.4 | 1.4 | 1.3 | 1.2 | 3 | 3.3 | 3.1 | 3.1 |

The experiments indicate that, under long cyclic intermittent irradiation of the UVA-340 lamp tube, the differences in reversible photochromic response time of embodiments 1-5 are small, and the obtained color difference value ΔE is less than or equal to 1.5. It is difficult for human eyes to distinguish the difference, indicating that the film coating still has good reversible photochromic performance and indicating that the prepared spirooxazine photochromic exterior wall coating has high light fatigue resistance under the condition of simulating outdoor long illumination and can be used as a coating commodity which is generally applied in building exterior walls. The color difference between embodiment 1 and reference example 1 is reduced, and the color difference between embodiments 1-3 and 4. The spirooxazine photochromic exterior wall coating according to claim 1, wherein the dispersant comprises an ammonium polyacrylate dispersant.

5. The spirooxazine photochromic exterior wall coating according to claim 1, wherein the antifoamer comprises polyoxypropylene oxyethylene glycol ether.

6. A preparation method for the spirooxazine photochromic exterior wall coating of claim 1, comprising the following steps:
S1. measuring: measuring 0.6%-1.5% of spirooxazine photochromic compound, 40%-45% of resin, 0.3%-1% of dispersant, 0.2%-0.3% of antifoamer, 1%-3% of additive, 22%-24% of pigment and 30%-32% of solvent;

S2. grinding: mixing the spirooxazine photochromic compound and the pigment measured in S1 and then grinding into powder with fineness of 100-300-mesh sieve;

S3. dispersing: adding 50 wt % of resin measured in step S1, dispersant, 30 wt % of solvent measured in S1, and mixed powder obtained in step S2 to a high-speed disperser and dispersing for 10-15 min at rotation speed of 1500-1800 r/min;

S4. mixing: putting the materials obtained in S3 into a mixing container, adding the remaining resin, solvent, antifoamer and additive, and stirring and mixing for 30-50 min at the rotation speed of 450-600 r/min;

S5. adjusting pH: adjusting pH with 1 mol/L NaOH solution, so that PH value is 8-8.5;

S6. filtering: filtering out insoluble solid impurities with a 100-300-mesh sieve to obtain the spirooxazine photochromic exterior wall coating.

7. A preparation method for the spirooxazine photochromic exterior wall coating of claim 2, comprising the following steps:

S1. measuring: measuring 0.6%-1.5% of spirooxazine photochromic compound, 40%-45% of resin, 0.3%-1% of dispersant, 0.2%-0.3% of antifoamer, 1%-3% of additive, 22%-24% of pigment and 30%-32% of solvent;

S2. grinding: mixing the spirooxazine photochromic compound and the pigment measured in S1 and then grinding into powder with fineness of 100-300-mesh sieve;

S3. dispersing: adding 50 wt % of resin measured in step S1, dispersant, 30 wt % of solvent measured in S1, and mixed powder obtained in step S2 to a high-speed disperser and dispersing for 10-15 min at rotation speed of 1500-1800 r/min;

S4. mixing: putting the materials obtained in S3 into a mixing container, adding the remaining resin, solvent, antifoamer and additive, and stirring and mixing for 30-50 min at the rotation speed of 450-600 r/min;

S5. adjusting pH: adjusting pH with 1 mol/L NaOH solution, so that PH value is 8-8.5;

S6. filtering: filtering out insoluble solid impurities with a 100-300-mesh sieve to obtain the spirooxazine photochromic exterior wall coating.

8. A preparation method for the spirooxazine photochromic exterior wall coating of claim 3, comprising the following steps:

S1. measuring: measuring 0.6%-1.5% of spirooxazine photochromic compound, 40%-45% of resin, 0.3%-1% of dispersant, 0.2%-0.3% of antifoamer, 1%-3% of additive, 22%-24% of pigment and 30%-32% of solvent;

S2. grinding: mixing the spirooxazine photochromic compound and the pigment measured in S1 and then grinding into powder with fineness of 100-300-mesh sieve;

S3. dispersing: adding 50 wt % of resin measured in step S1, dispersant, 30 wt % of solvent measured in S1, and mixed powder obtained in step S2 to a high-speed disperser and dispersing for 10-15 min at rotation speed of 1500-1800 r/min;

S4. mixing: putting the materials obtained in S3 into a mixing container, adding the remaining resin, solvent, antifoamer and additive, and stirring and mixing for 30-50 min at the rotation speed of 450-600 r/min;

S5. adjusting pH: adjusting pH with 1 mol/L NaOH solution, so that PH value is 8-8.5;

S6. filtering: filtering out insoluble solid impurities with a 100-300-mesh sieve to obtain the spirooxazine photochromic exterior wall coating.

9. A preparation method for the spirooxazine photochromic exterior wall coating of claim 4, comprising the following steps:

S1. measuring: measuring 0.6%-1.5% of spirooxazine photochromic compound, 40%-45% of resin, 0.3%-1% of dispersant, 0.2%-0.3% of antifoamer, 1%-3% of additive, 22%-24% of pigment and 30%-32% of solvent;

S2. grinding: mixing the spirooxazine photochromic compound and the pigment measured in S1 and then grinding into powder with fineness of 100-300-mesh sieve;

S3. dispersing: adding 50 wt % of resin measured in step S1, dispersant, 30 wt % of solvent measured in S1, and mixed powder obtained in step S2 to a high-speed disperser and dispersing for 10-15 min at rotation speed of 1500-1800 r/min;

S4. mixing: putting the materials obtained in S3 into a mixing container, adding the remaining resin, solvent, antifoamer and additive, and stirring and mixing for 30-50 min at the rotation speed of 450-600 r/min;

S5. adjusting pH: adjusting pH with 1 mol/L NaOH solution, so that PH value is 8-8.5;

S6. filtering: filtering out insoluble solid impurities with a 100-300-mesh sieve to obtain the spirooxazine photochromic exterior wall coating.

10. A preparation method for the spirooxazine photochromic exterior wall coating of claim 5, comprising the following steps:

S1. measuring: measuring 0.6%-1.5% of spirooxazine photochromic compound, 40%-45% of resin, 0.3%-1% of dispersant, 0.2%-0.3% of antifoamer, 1%-3% of additive, 22%-24% of pigment and 30%-32% of solvent;

S2. grinding: mixing the spirooxazine photochromic compound and the pigment measured in S1 and then grinding into powder with fineness of 100-300-mesh sieve;

S3. dispersing: adding 50 wt % of resin measured in step S1, dispersant, 30 wt % of solvent measured in S1, and mixed powder obtained in step S2 to a high-speed disperser and dispersing for 10-15 min at rotation speed of 1500-1800 r/min;

S4. mixing: putting the materials obtained in S3 into a mixing container, adding the remaining resin, solvent, antifoamer and additive, and stirring and mixing for 30-50 min at the rotation speed of 450-600 r/min;

S5. adjusting pH: adjusting pH with 1 mol/L NaOH solution, so that PH value is 8-8.5;

S6. filtering: filtering out insoluble solid impurities with a 100-300-mesh sieve to obtain the spirooxazine photochromic exterior wall coating.

11. The preparation method for the spirooxazine photochromic exterior wall coating according to claim 6, wherein in step S4, the materials obtained in S3, 35% of the solvent measured in S1, and the additive are stirred for 10-20 min at the rotation speed of 550-600 r/min, and then the remaining resin, 35% of the solvent measured in S1, and the antifoamer are added and stirred for 20-30 min at the rotation speed of 450-500 r/min.

* * * * *